Figure 1:
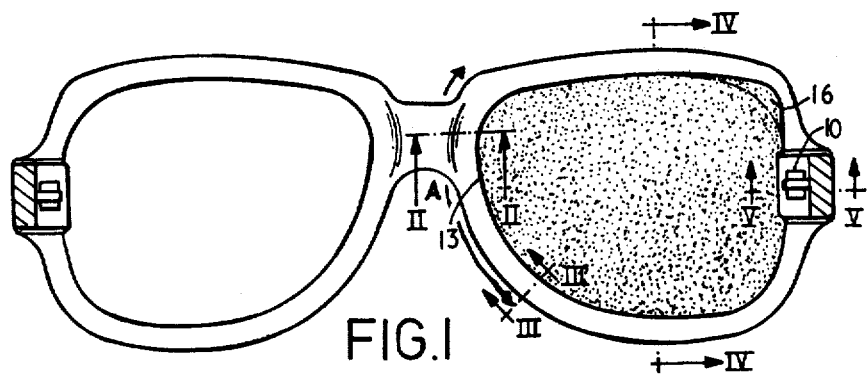

United States Patent [19]
Zingarelli

[11] 3,890,037
[45] June 17, 1975

[54] SPECTACLE FRAMES WITH REMOVABLE TINTED LENSES

[75] Inventor: Dino Zingarelli, Darling Point, New South Wales, Australia

[73] Assignee: Martin Wells Pty. Ltd., Australia

[22] Filed: Dec. 18, 1973

[21] Appl. No.: 425,809

[30] Foreign Application Priority Data
Dec. 28, 1972  Australia............................ 1734/72
Feb. 7, 1973  Australia............................ 2164/73

[52] U.S. Cl. ..................... 351/47; 351/49; 351/57
[51] Int. Cl.............................................. G02c 9/04
[58] Field of Search ................ 351/47, 49, 57, 58

[56] References Cited
UNITED STATES PATENTS
2,413,193  12/1946  Robblee............................ 351/47 X
2,511,329  6/1950  Craig.................................. 351/47
2,688,900  9/1954  Silverman........................... 351/49
3,427,098  2/1969  Johnston............................. 351/47

FOREIGN PATENTS OR APPLICATIONS
310,322  1/1930  United Kingdom.................. 351/58
610,452  10/1948  United Kingdom.................. 351/47

Primary Examiner—Paul A. Sacher
Attorney, Agent, or Firm—Steinberg & Blake

[57] ABSTRACT

A means whereby an ordinary pair of spectacles may be readily converted into a pair of sunglasses by the attachment of additional tinted flexible plastic lenses which are frictionally engaged with the portions of the frame surrounding the lenses on the side of the lens adjacent the face of a user.

9 Claims, 12 Drawing Figures

SPECTACLE FRAMES WITH REMOVABLE TINTED LENSES

The present invention relates to spectacle frames and has as its object the provision of a spectacle frame to which additional tinted plastic lenses may be readily attached thus converting a normal pair of spectacles into a pair of sun glasses.

For persons who normally wear spectacles, it is known to provide a pair of tinted plastic lenses which can be clipped onto the front of the spectacles so as to convert the normal spectacles into a pair of sun glasses. Such "clip-on" attachments are quite satisfactory in that they can be readily attached to or removed from the spectacles according to the user's requirements. On the other hand, by reason of the fact that they are attached to the front of the spectacles by means of visible metal clips, they are somewhat unsightly.

The present invention provides a spectacle frame construction such that a user may carry a pair of flexible tinted plastic lenses which can be individually attached to the rear face of the spectacle frame by being simply pressed into position and which can be equally easily removed.

The present invention consists in a spectacle frame wherein the lens holding portion of the frame surrounding each lens is provided with abutment means such that an additional tinted flexible plastic lens having an outline corresponding to the lens holding portion of the spectacle frame and provided with appropriate curvature can be engaged with one of said abutments means and thereafter presses into frictional engagement with the other to be retained in position on the lens holding portion of the frame behind the lens.

The invention further consists in a spectacle frame having lenses fitted therein in combination with a pair of additional flexible tinted plastic lenses frictionally retained in position on the lens holding portion of the frame behind each lens so as to be readily removable therefrom, means being provided to facilitate such removal. The plastic lenses are preferably of polarizing material.

Figure 2:
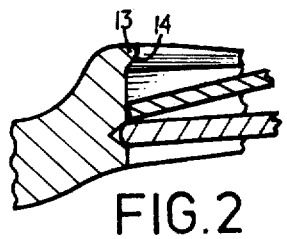
Figure 3:
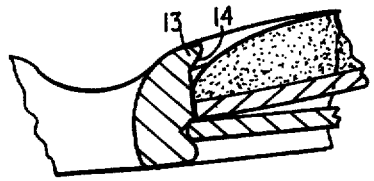
Figure 4:
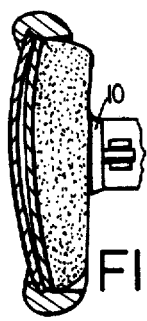
Figure 5:
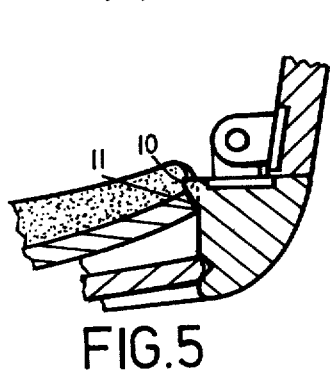
Figure 6:
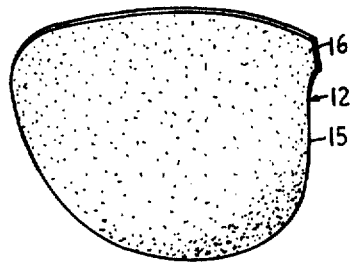
Figure 7:
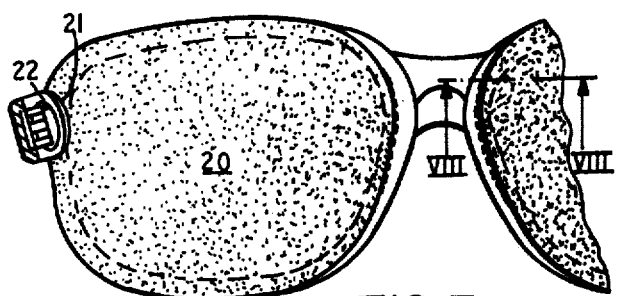
Figure 8:
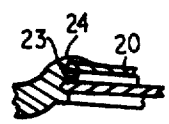
Figure 9:
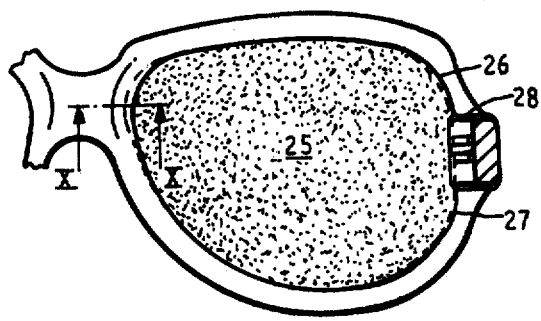
Figure 10:
Figure 11:
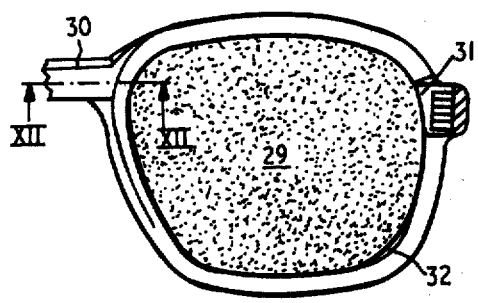
Figure 12:

In order that the nature of the invention may be better understood a preferred form of the invention is hereinafter described by way of example, with reference to the accompanying drawings, in which:

FIG. 1 is a view of the rear face of a pair of spectacle frames the temples being shown in section, an additional tinted lens being shown in the right hand side of the frame, FIG. 2 is a cross-section on line II—II of FIG. 1. to an enlarged scale, FIG. 3 is a cross-section on line III—III of FIG. 1, to an enlarged scale, FIG. 4 is a sectional view on line IV—IV of FIG. 1 to an enlarged scale, FIG. 5 is a sectional view on line V—V of FIG. 1 to an enlarged scale, FIG. 6 is a view showing an additional tinted lens for insertion in the right hand side of the frame of FIG. 1, FIG. 7 is a view similar to FIG. 1 of a modified form of construction showing part of the frame, FIG. 8 is a cross-sectional view on line VIII—VIII of FIG. 7, FIG. 9 is a view of one half of the frame of a further form of the invention, FIG. 10 is a cross-sectional view on line X—X of FIG. 9, FIG. 11 is a view similar to FIG. 9 of a still further form of the invention, and FIG. 12 is a cross-sectional view on line XII—XII of FIG. 11.

The spectacle frame shown in FIGS. 1 to 5 is constructed along generally conventional lines using normal manufacturing techniques. However, it differs from the normal spectacle frame in that, around the hinge mount there is provided an integral substantially rectangular boss or projection 10, which projects inwardly beyond the normal internal periphery of the frame and overhangs the lens as can be seen in FIG. 1 and has a sloping undercut surface 11 as is shown in FIG. 5. This provides one abutment for the location of an additional tinted plastic lens 12. In the particular embodiment described this abutment is formed as described below but it could be provided by making the temple hinge an appropriate shape.

The other way in which the frame differs from the conventional frame is in the shaping of the inner periphery of that part of the frame in the region of the bridge immediately opposite the abutment 10. This portion is shaped so as to provide an integral projecting and overhanging portion 13 which extends over a substantial portion of that part of the periphery of the frame, extending approximately over the Arc "A" of FIG. 1. It has an undercut sloping surface 14. The boss 10 and the portion 13 are preferably formed by making the blank for the frame from sheet material of, for example, 8 mm in thickness. This is then reduced to, for example, 6 mm over the whole area around each lens except in the areas of the boss 10 and the portion 13. The inner peripheral edges of these thicker parts of the frame are then provided with the undercut sloping surfaces 11 and 14 shown in FIGS. 5 and 2 which are formed on the inner peripheral surface of the additional 2 mm of thickness, which stand above the remainder of the lens holding portion.

In FIG. 6 is shown the additional tinted plastic lens 12 for attachment to the right hand side of the spectacle frame. These are shaped to substantially the same outline as the portion of the frame surrounding the lens so that when placed in position behind the frame it will lie within the periphery of the frame, including upper and lower portions thereof (FIG. 4), so that from the front of the spectacle nothing additional is seen.

The additional lens 12 has a substantially straight portion 15 (see FIG. 6) which engages the substantially straight inner edge of the projection 10 on the frame during insertion of the additional lens and fits beneath the sloping portion 11 when in position. Immediately above the straight portion 15 is an ear 16 which, when the additional lens is in position overlies the frame as shown in FIG. 1 and assists in the removal of the additional lens. The remainder of the peripheral surface of the additional lens corresponds in shape and size to the inner peripheral shape of the lens holding portion of the frame where it meets the lens.

The additional lens is placed in position by first inserting the edge opposite the ear 16 into the frame so that the edge engages the peripheral portion lying within the arc A and lies beneath the sloping surface 14. The portion 15 is then pressed lightly down on the projection 10. This slightly deforms the additional lens allowing it to engage beneath the sloping surface 11 where it is held securely in position. The additional lens is removed merely by lifting the ear 16.

It must be emphasised that the additional lens must be fitted very accurately if it is to be easily inserted and removed on the one hand, and securely retain, on the other. Final fitting of the additional lens would normally be performed by the optician supplying the spectacles.

It has been found that the provision of the straight portion 15 is a valuable means of readily adjusting the shape of an additional lens to fit a particular frame. For reasons well known in the art, in a pair of spectacles having nominally the same frames and the same lenses, variations of size can occur, which will make it necessary to adjust the shape of an additional lens slightly to suit a particular frame. In this form of the invention the additional lens is constructed so that such adjustment need consist only slightly filing away the straight portion without necessity for re-shaping the remaining portions of the periphery of the additional lens.

The provision of the ear 16 is not absolutely necessary so long as a portion of the additional lens overlies the frame at a point adjacent the projection 10, either above or below, to enable a force to be applied to remove it.

The additional lens for insertion in the left hand side of the frame is a mirror image of that shown in FIG. 6.

In the embodiment of the invention shown in FIGS. 7 and 8 the additional lens 20 is provided with a part-circular cutaway portion 21 which fits around a correspondingly shaped boss 22 on the frame. The frame is provided with a shoulder 23 (FIG. 8) on which the additional lens rests.

To insert the additional lens 20 the cutaway portion 21 is engaged about the abutment 22 and the other edge of the additional lens is then pressed down onto the shoulder 23 and frictionally engaged with the portion 24 above it.

In this embodiment the additional lens largely overlies the portion of the frame surrounding the lens except in the region corresponding to that lying within the arc A of FIG. 1 while not extending beyond its outer periphery. Accurate fitting of the additional lens is effected by slightly enlarging or re-shaping the cutaway portion 21.

The embodiment illustrated in FIGS. 9 and 10 is in the majority of respects the same as that illustrated in FIG. 1 except for the fact that the additional lens 25 overlies the frame over areas indicated at 26 and 27 above and below the projection 28 which corresponds to the projection 10 of FIG. 1.

FIGS. 11 and 12 show a further form of construction in which the additional lens 29 lies wholly within the periphery of the portion of the frame surrounding the lens and is constructed to jam against the inner surfaces of those portions of the frame adjacent the bridge 30 and the hinge 31. In order to extract the additional lens it is shaped to provide a gap 32 in the right hand bottom corner as seen in FIG. 11 into which a fingernail may be inserted to remove the additional lens. While this form of the invention will work satisfactorily, it is believed that when applied commercially the difficulty of getting a sufficiently good fit between the additional lens and the frame may make it impractical.

The additional lens is made by moulding from thin sheet plastic material which is tinted and flexible and which is preferably of a polarizing nature so that the user has the benefit of the polarizing characteristics of the material.

A user of spectacles having frames according to the invention has only to carry a pair of the additional plastic lenses which are very light and can be readily accomodated in an additional pocket or pockets of a conventional spectacles case and can simply press these into position behind the lenses of the spectacles when he wishes to convert them to sun glasses. When in position the additional lenses are invisible from the front of the spectacles and give the impression that the wearer is wearing a pair of tinted spectacles.

In the preferred embodiments of the invention described above particular ways of locating and fixing the additional lens have been described but it is to be understood that other means of doing this are within the scope of the invention. Whereas in the preferred embodiment abutment means have been provided on either side of the portion of the frame surrounding each lens it would for example, be possible to provide abutments in the upper and lower portions of the part of the frame surrounding the lens.

The term "temple hinge" is used to refer to the hinge joint by means of which each temple of the spectacle frame is attached to the front.

I claim:

1. A spectacle frame having permanent fixed lenses and a lens holding portion surrounding each permanent lens and provided with a pair of substantially opposed abutment means which in their entirety are integral and form one piece with said lens holding portion such that an additional tinted flexible plastic lens having an outline corresponding to said lens holding portion and provided with appropriate curvature can be engaged with one of said abutment means and thereafter snapped past the other to be retained in position on the lens holding portion between said pair of abutment means and the permanent lens, said pair of abutment means extending rearwardly from the remainder of each lens holding portion so that each additional lens is situated behind a permanent lens, said pair of abutment means respectively forming an integral part of each lens holding portion at an inner peripheral region thereof adjacent a bridge of the frame and an integral part of each lens holding portion at the region of a temple hinge of the frame, with the abutment means at the region of said temple hinge having the configuration of a boss, and both of said abutment means having inner surface regions directed inwardly toward a central part of each lens holding portion, and said surface regions being undercut for overhanging said permanent lens and an edge region of each additional lens to retain the latter temporarily in position behind each permanent lens.

2. A spectacle frame as claimed in claim 1 wherein said pair of abutment means are thicker than the remainder of each lens holding portion and each being provided with a sloping undercut surface overhanging the permanent lens.

3. A spectacle frame having a pair of lens holding portions and a pair of permanent lenses fitted therein, respectively, in combination with a pair of additional flexible, resilient tinted plastic lenses releasably retained in position respectively on said lens holding portions of the frame behind said permanent lenses, respectively, so as to be readily removable therefrom, means being provided to facilitate such removal, each of said lens holding portions having an inner peripheral region adjacent a bridge of the frame and an outer peripheral region adjacent a temple hinge of the frame and each lens holding portion having respectively at said inner and outer peripheral regions thereof a pair of integral abutment means which in their entirety form one piece with each lens holding portion and which extend rearwardly from the remainder of each lens holding portion, and said pair of abutment means of each lens holding portion respectively having inner surface regions directed inwardly toward a central part of each lens holding portion and being undercut, with said surface regions overlapping opposed edge regions of said tinted lenses so that the latter are releasably held by said lens holding portions behind said permanent lenses, each of said flexible resilient tinted plastic lenses being capable of flexing past one of said abutment means of each lens holding portion while being engaged between the other of the abutment means thereof and the permanent lens for attaching the tinted lenses to and removing them from the lens holding portions.

4. The combination claimed in claim 3 wherein a portion of each additional lens projects over the lens holding portion of the frame to constitute said means to facilitate removal of each additional lens.

5. The combination of claim 4 and wherein except for said portion of each additional lens which projects over each lens holding portion, the remainder of each additional lens is surrounded by said lens holding portion including upper and lower regions of the latter.

6. The combination of claim 5 and wherein said portion of each additional lens which forms said means facilitating removal thereof is situated at the region of the abutment means which is situated at the outer peripheral region of each lens holding portion adjacent the temple hinge.

7. The combination of claim 6 and wherein said portion of each additional lens which forms said means to facilitate removal thereof includes only an ear extending over said abutment means adjacent each temple hinge.

8. The combination of claim 7 and wherein each additional lens has extending downwardly from said ear an elongated substantially straight edge portion.

9. The combination of claim 5 and wherein said portion of each additional lens is situated above and below said abutment means adjacent each temple hinge.

* * * * *